United States Patent
Wang

(10) Patent No.: US 8,286,226 B2
(45) Date of Patent: Oct. 9, 2012

(54) PASSWORD PROTECTION SYSTEM

(75) Inventor: Kui-Jun Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 427 days.

(21) Appl. No.: 12/693,417

(22) Filed: Jan. 25, 2010

(65) Prior Publication Data
US 2010/0333195 A1    Dec. 30, 2010

(30) Foreign Application Priority Data
Jun. 25, 2009   (CN) .......................... 2009 1 0303666

(51) Int. Cl.
*H04L 9/32*   (2006.01)

(52) U.S. Cl. .............................................. 726/6; 726/19

(58) Field of Classification Search .................... 726/27, 726/19, 7, 5; 713/323, 186, 171, 100; 380/264, 380/262, 251, 277
See application file for complete search history.

(56) References Cited

U.S. PATENT DOCUMENTS

2001/0027529 A1*  10/2001  Sasabe et al. ................. 713/202
2009/0172810 A1*   7/2009  Won et al. ...................... 726/19
* cited by examiner

*Primary Examiner* — Brandon Hoffman
*Assistant Examiner* — Nega Woldemariam
(74) *Attorney, Agent, or Firm* — Altis Law Group, Inc.

(57) ABSTRACT

A password registering method used in an electronic device includes displaying one visual dial on a touch screen of the electronic device; recording rotation parameters of the visual dial rotated by a user, and generating input information according to the rotation parameters; and registering the password according to the generated input information the user's confirming the rotation operation.

14 Claims, 4 Drawing Sheets

PASSWORD PROTECTION SYSTEM

BACKGROUND

1. Technical Field

The disclosure relates to information security field, and more particularly to a password protection system.

2. Description of Related Art

Password protection is already widely used in daily life, such as for computer, mobile phones, automatic teller machines, etc. Usually, a combination of numbers and characters is used as a password. However, unauthorized users can use certain software to crack the password, thereby obtaining unauthorized access.

Therefore, it is necessary to provide a password protected system to avoid password cracking.

BRIEF DESCRIPTION OF THE DRAWINGS

The components in the drawing are not necessarily drawn to scale, the emphasis instead being placed upon clearly illustrating the principles of the password protection system.

DETAILED DESCRIPTION

Figure 1:
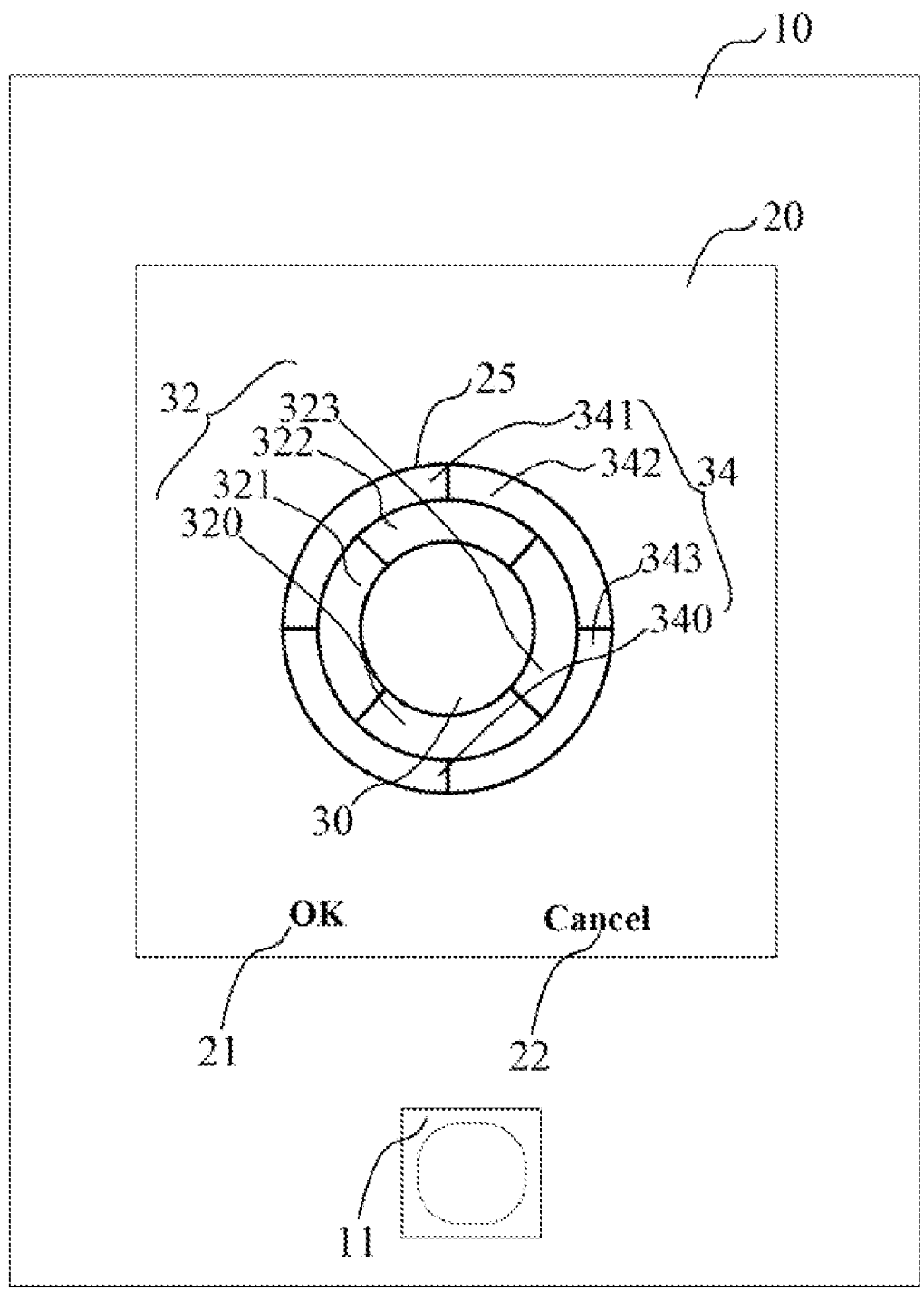
FIG. 1 is a schematic diagram showing an exemplary embodiment of a first interface of a password protection system.

FIG. 1 is a schematic diagram showing an exemplary embodiment of a first interface of a password protection system. The password protection system may be stored in electronic devices 10 in a form of program codes. When the electronic device 10 is activated, the program codes are executed by a processor of the electronic device 10 to implement the password protection system. The electronic device 10 may be touch-screen phones, personal digital assistants (PDA), automatic teller machines (ATM), etc.

The password protection system includes two working modes, i.e., registering the password, and unlocking the electronic device 10. A user registers the password when he wants to use the password protection system to protect his private information. After registering the password, if he wants to unlock the electronic device 10, he should input the correct password to unlock the electronic device 10.

Once a password has been registered, then the following procedure is an example of how to unlock the password protected electronic device 10. As shown in FIG. 1, a touch screen 20 of the electronic device 10 displays a first interface 23 including a visual dial 25. The visual dial 25 includes a first region 30, a second region 32, and a third region 34. The second region 32 and the third region 34 may be rotated relative to the first region 30. The user can rotate the second region 32 or the third region 34 by moving one finger circularly on the corresponding second region 32 or third region 34 based on personal preferences. When the user rotates the second region 32 or the third region 34 relative to the first region 30, the electronic device 10 records the angle and direction of the second region 32 and the third region 34 relative to the first region 30, after the operation ends. When the user moves his finger away, the second region 32 or the third region 34 returns to a prior position.

The second region 32 and the third region 34 may also be divided into several sub-regions. As shown in FIG. 1, the second region 32 is divided into sub-regions 320-323, and the third region 34 is divided into sub-regions 340-343. Each of the sub-regions may be color-coded (not shown) distinguishing it from the other sub-regions. Therefore, the user can find a desired sub-region according to its color.

Figure 2:
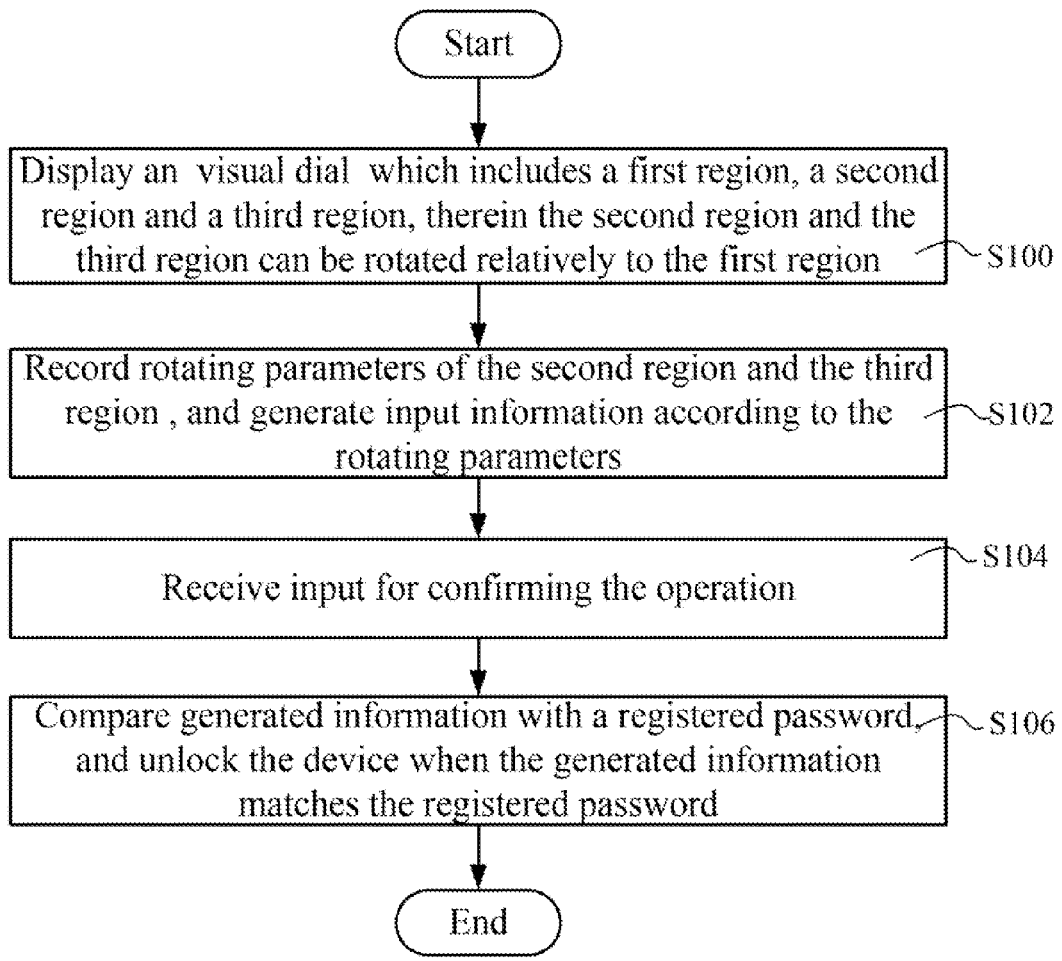
FIG. 2 is a flowchart implementing the password protection system in an exemplary embodiment of the present disclosure.

FIG. 2 is a flowchart of unlocking the electronic device 10 using a password protection system in an exemplary embodiment of the present disclosure.

In step S100, the touch screen 20 displays the first interface 23 including the visual dials 25 on the touch screen 20, which includes the first region 30, the second region 32, and the third region 34. A user then inputs his password by rotating the second region 32 and the third region 34 relative to the first region 30.

In step S102, the electronic device 10 records rotation parameters of the second region 32 and the third region 34, and generates input information (password) according to the rotation parameters. The rotation parameters include, but are not limited to, the angle and the direction of the rotation of the second region 32 and the third region 34. In other embodiments, the rotation parameters may further include information of the sub-region selected by the user. The information can be expressed by the color of the sub-region.

Figure 3:
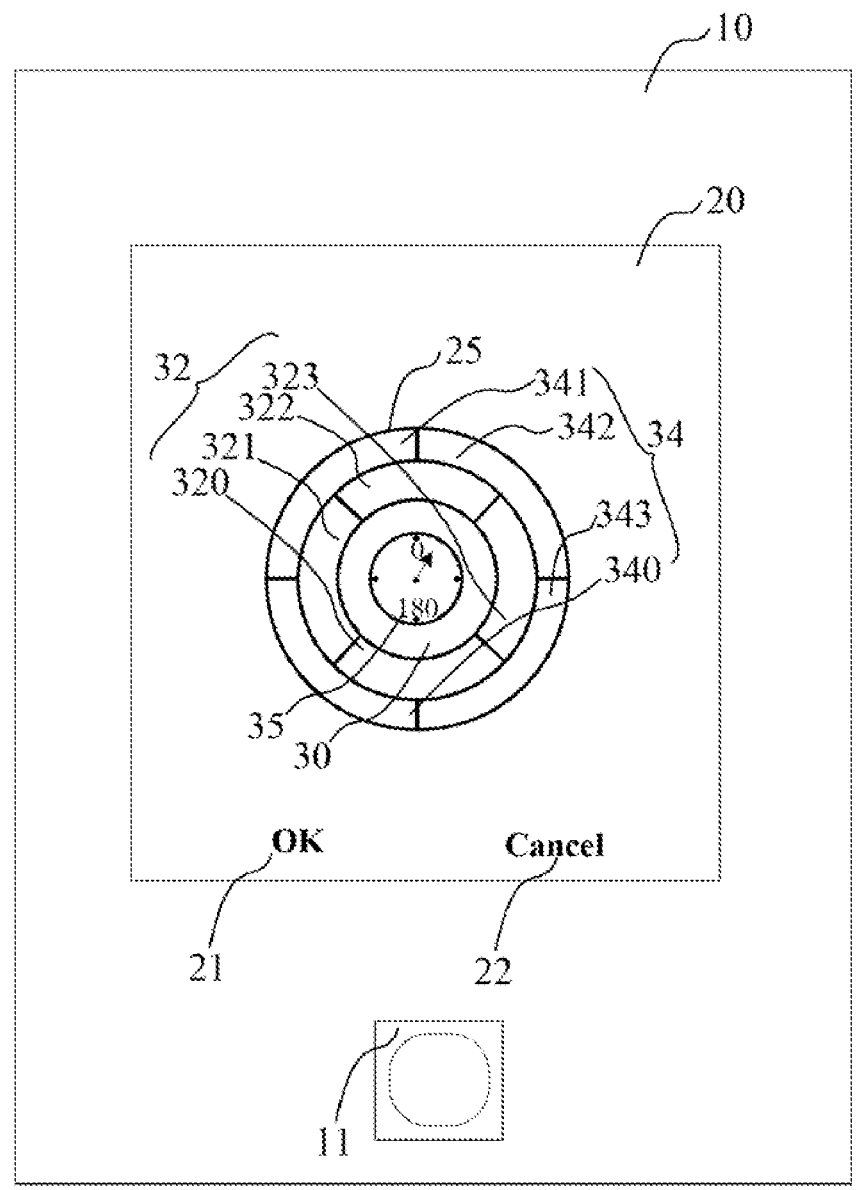
FIG. 3 is a schematic diagram showing an exemplary embodiment of a second interface of the password protection system.

Referring FIG. 3, the electronic device 10 is also configured to display an angle table 35 on the first area 30 to indicate the rotated angle value of the second region 32 and the third region 34. When the user finishes the rotation operations on the second region 32 and the third regional 34, the angle table 35 is hidden.

In step S104, the electronic device 10 receives a predetermined input from the user to confirm the end of the rotation operation. For example, the predetermined input can be button presses, which is an entity button 11 or a visual button 21 generated by software.

In step S106, in response to the confirmation operation, the electronic device 10 compares the generated input information with the registered password, and unlocks the electronic device 10 when the generated input information matches the registered password.

In addition, the registering process is similar to the method of inputting password for unlocking the electronic device 10, except in step S106 of the registering process, where the generated input information is generated according to the rotation parameters to register the password.

In another embodiment, if the rotation angle of the second region 32 or the third region 34 is greater than a threshold value, the electronic device 10 records a predetermined value as the current rotation angle of the second region 32 or the third region 34. For example, the threshold value of 30 degrees and the predetermined value of 60 degrees, if the rotation angle of the second region 32 or the third region 34 is more than 30 degrees, the rotation angle of the second region 32 or the third region 34 is recorded as the predetermined value of 60 degrees. In this way, there is no need to record exact rotation angle values of the rotation operation.

Figure 4:
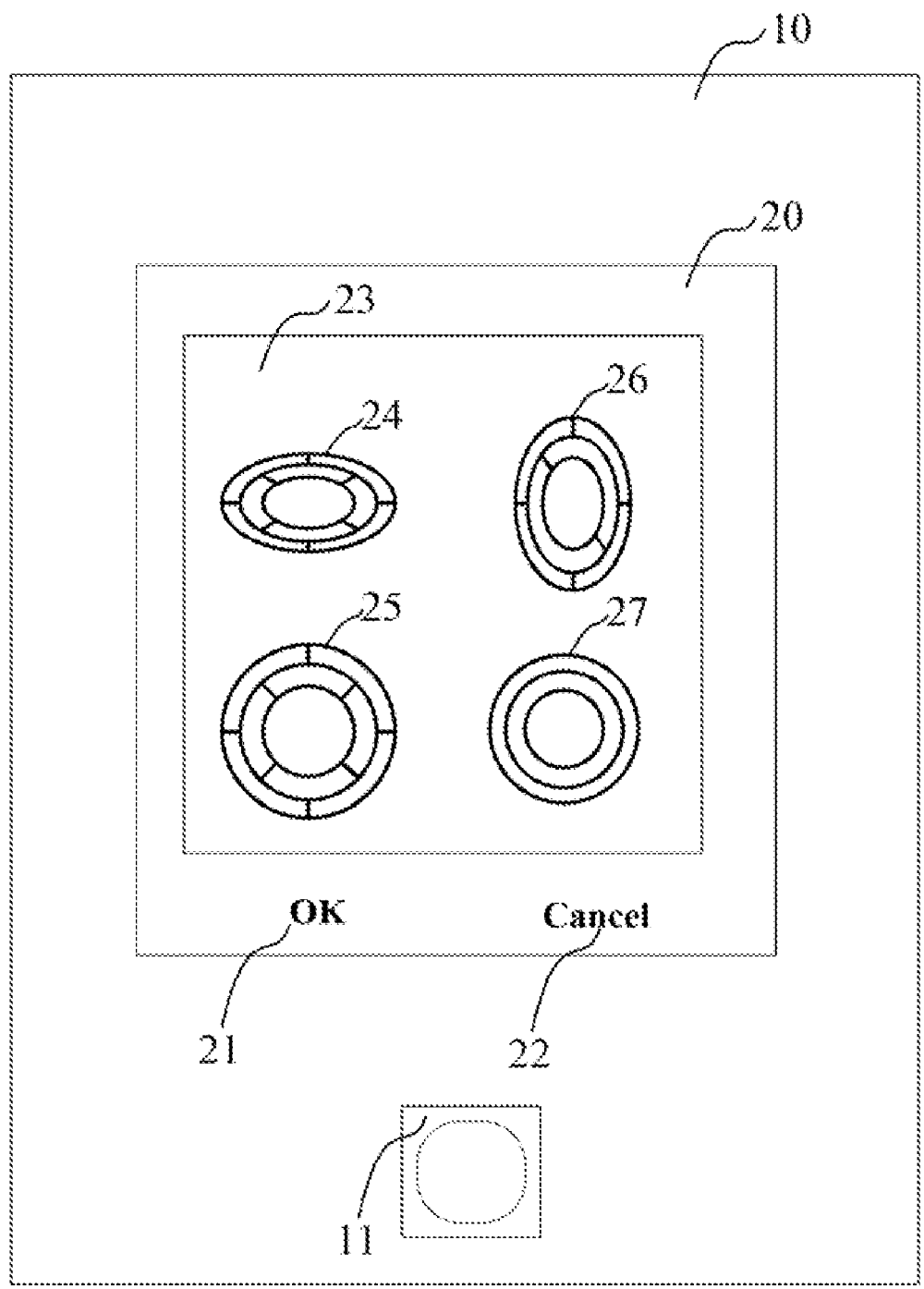
FIG. 4 is a schematic diagram showing an exemplary embodiment of a third interface of the password protection system.

FIG. 4 is a schematic diagram showing an exemplary embodiment of a third interface of the password protection system. The touch screen 20 displays one or more visual dials 24-27 for user selection. The touch screen 20 displays the selected visual dial 25, as shown in FIG. 1, if the visual dial 25 is selected. Then the selected visual dial 25 can be also recorded as a rotation parameter. When unlocking the electronic device 10, the user has to select the correct visual dial 25; otherwise, the electronic device 10 cannot be unlocked.

By utilizing a password protection system as described above, which applies the rotation angle and rotation direction and even color as a registered password and input information, the user can simply complete the password registered and/or the password input through the rotation movement of the finger on the touch pad, which is different from traditional fixed combinations of numbers and letters. Unauthorized users cannot easily crack password with software, thus effectively protecting the user's information.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the present disclosure.

What is claimed is:

1. A password registering method used in an electronic device, the method comprising:
   displaying one visual dial on a touch screen of the electronic device;
   recording rotation parameters of the visual dial rotated by a user, and generating input information according to the rotation parameters; and
   registering the password according to the generated input information after the user's confirming the rotation operation,
   wherein the rotation parameters include an angle and a direction of the rotation operation, the visual dial includes a first region, a second region and a third region, and the second region and the third region could rotate relatively to the first region; and the steps further include recording rotation parameters of the second region and the third region based on the first region, and generating input information according to the rotation parameters.

2. The password registering method according to claim 1, wherein the second region and the third region are divided into sub-regions, each of the sub-regions is set to one fixed color that is different from other sub-regions, and the rotation parameter further includes color of the sub-region selected by the user.

3. The password registering method according to claim 1, wherein the steps further includes displaying an angle table on the first region to indicate the rotated angle value of the second region and the third region, and hiding the angle table when the operation of the second region and the third region is ended.

4. The password registering method according to claim 1, wherein the method further includes displaying a plurality of visual dials on the touch screen, selecting one visual dial from the plurality of visual dials, and recording the selected visual dial as a part of rotation parameters.

5. The password registering method according to claim 1, wherein the steps further include recording a predetermined value if the rotation angle of the second region or the third region is larger than a threshold value.

6. A password protection method for unlocking an electronic device, the method comprising:
   displaying a visual dial on a touch screen of the electronic device;
   recording rotation parameters of the visual dial rotated by a user, and generating input information according to the rotation parameters;
   comparing generated input information with a registered password after the user's confirming the rotation operation to unlock the electronic device; and
   unlocking the device when the generated information matches the registered password,
   wherein the rotation parameters include an angle and a direction of the rotation operation, the visual dial includes a first region, a second region and a third region, and the second region and the third region could rotate relatively to the first region; and the steps further include recording rotation parameters of the second region and the third region based on the first region, and generating input information according to the rotation parameters.

7. The password protection method according to claim 6, wherein the second region and the third region are divided into sub-regions, each of the sub-regions is set to one fixed color that is different from other sub-regions, and the rotation parameter further includes color of the sub-region selected by the user.

8. The password protection method according to claim 7, wherein the steps further includes displaying an angle table on the first region to indicate the rotated angle value of the second region and the third region, and hiding the angle table when the operation of the second region and the third region is ended.

9. The password protection method according to claim 7, wherein the steps further include recording a predetermined value if the rotation angle of the second region or the third region is larger than a threshold value.

10. The password protection method according to claim 7, wherein the method further includes displaying a plurality of visual dials on the touch screen, selecting one visual dial from the plurality of visual dials, and recording the selected visual dial as a part of rotation parameters.

11. A password protection method used in a electronic device, the method comprising:
   displaying at least one visual dial on a touch screen of the electronic device;
   recording a first group of rotation parameters of the visual dial rotated by a user, and generating a first input information according to the first group of rotation parameters;
   registering the password according to the first generated input information after confirming the rotation operation;
   recording a second group of rotation parameters of the visual dial rotated, and generating a second input information according to the second group of rotation parameters;
   comparing the second generated input information with the registered password after confirming the rotation operation to unlock the electronic device; and
unlocking the device when the generated information matches the registered password,
   wherein the rotation parameters include an angle and a direction of the rotation operation, the visual dial includes a first region, a second region and a third region, and the second region and the third region could rotate relatively to the first region; and the steps further include recording rotation parameters of the second region and the third region based on the first region, and generating input information according to the rotation parameters.

12. The password protection method according to claim 11, wherein the second region and the third region are divided into sub-regions, each of the sub-regions is set to one fixed color that is different from other sub-regions, and the rotation parameter further includes color of the sub-region selected by the user.

13. The password protection method according to claim 11, wherein the steps further include displaying an angle table on the first region to indicate the rotated angle value of the second region and the third region, and hiding the angle table when the operation of the second region and the third region is ended.

14. The password protection method according to claim 13, wherein the steps further includes recording a predetermined value if the rotation angle of the second region or the third region is larger than a threshold value.

* * * * *